United States Patent [19]
Dulong

[11] Patent Number: 5,737,561
[45] Date of Patent: Apr. 7, 1998

[54] METHOD AND APPARATUS FOR EXECUTING AN INSTRUCTION WITH MULTIPLE BRANCING OPTIONS IN ONE CYCLE

[75] Inventor: Carole Dulong, Saratoga, Calif.

[73] Assignee: Intel Corporation, Santa Clara, Calif.

[21] Appl. No.: 743,421

[22] Filed: Nov. 1, 1996

Related U.S. Application Data

[63] Continuation of Ser. No. 377,482, Jan. 24, 1995, abandoned, which is a continuation of Ser. No. 7,582, Jan. 22, 1993, abandoned.

[51] Int. Cl.$^6$ .............................. G06F 1/08; G06F 9/38; G06F 9/42
[52] U.S. Cl. .......................... 395/391; 395/800; 395/581; 364/DIG. 1; 364/DIG. 2
[58] Field of Search .................... 395/800, 309, 395/200.01, 391, 821, 382, 182.02, 704, 585, 500, 581, 552, 582, 595; 364/DIG. 1, DIG. 2

[56] References Cited

U.S. PATENT DOCUMENTS

| | | | |
|---|---|---|---|
| 4,084,235 | 4/1978 | Hirtle et al. | 395/500 |
| 4,093,981 | 6/1978 | AcAllister et al. | 395/182.02 |
| 4,245,300 | 1/1981 | Kaufman et al. | 395/821 |
| 4,295,193 | 10/1981 | Pomerence | 395/375 |
| 4,819,233 | 4/1989 | Delucia et al. | 395/183.14 |
| 5,050,068 | 9/1991 | Dollas et al. | 395/375 |
| 5,051,940 | 9/1991 | Vassiliadis et al. | 364/736 |
| 5,142,634 | 8/1992 | Fite et al. | 395/375 |
| 5,203,002 | 4/1993 | Wetzel | 395/800 |

*Primary Examiner*—Daniel H. Pan
*Attorney, Agent, or Firm*—Blakely, Sokoloff, Taylor & Zafman

[57] ABSTRACT

A multi-alternative structure, such as a case instruction, in a computer system that can be executed in one cycle. The computer system of the present invention executes multiple instructions, wherein condition indicators are set according to the execution of each instruction. The multi-alternative structure includes conditional branching options, one of which being chosen according to the state of the condition indicators at the time the multi-alternative structure is executed. The method and apparatus includes registers for storing each of the target address. The registers are loaded prior to the execution of the multi-alternative structure, wherein upon execution, the chosen target address may be obtained quickly, such that the multi-alternative instruction is executed within one cycle.

9 Claims, 4 Drawing Sheets

FIG. 3A 40 BIT SHORT FORMAT

| 1 BIT | 7 BITS | 27 BITS | 5 BITS |
|---|---|---|---|
| 0 | SHORT CONTROL | ALU | PT |

FIG. 3B 80 BIT LONG FORMAT

| 1 BIT | 15 BITS | 27 BITS | 5 BITS | 27 BITS | 5 BITS |
|---|---|---|---|---|---|
| 1 | LONG CONTROL | ALU 1 | PT 1 | ALU 2 | PT 2 |

METHOD AND APPARATUS FOR EXECUTING AN INSTRUCTION WITH MULTIPLE BRANCING OPTIONS IN ONE CYCLE

This is a continuation of application Ser. No. 08/3777,485, now abandoned, which is a continuation of application Ser. No. 08/007,582, filed Jan. 22, 1993, now abandoned.

FIELD OF THE INVENTION

The present invention relates to the field of computer systems; particularly, the present invention relates to the performing of a case operation in a computer system.

BACKGROUND OF THE INVENTION

Today, there is great emphasis on increasing the speed of computer systems. Typically, the speed of computer systems is dictated by the speed at which the processor within the computer system can operate. Therefore, the speed of a computer system can be increased by the use of a faster processor (or associated co-processor where the case may be). One prior art technique for increasing the speed of a processor, and thus increasing the speed of a computer system, is to use pipelining. In pipelining, the execution of individual instructions is overlapped. By overlapping instruction execution, the computer system achieves parallelism.

When implementing pipelining, the execution of an individual instruction is broken down into stages. As each instruction completes one particular stage and moves to the next, the following instruction begins executing at that stage, such that the overall throughput of a computer system (i.e., how often an instruction completes execution in the pipeline) is approximately one cycle time.

Another technique utilized in microprocessors to achieve more parallelism in the execution process is to employ multiple execution units. For instance, in the case of super-scalar processors, multiple integer and floating point execution units are utilized for executing multiple instructions at the same time. In other words, while one instruction is being executed in one of the execution units, another instruction may be executed in another execution unit. In this manner, multiple instructions are executed at one time. The use of multiple execution units often are utilized in multiple pipeline systems in which a separate pipeline, or portion thereof, is employed in configuration with a distinct execution unit. In this case, multiple instructions can be executed in multiple execution pipelines to increase the throughput. Therefore, it is desirable to have a processor which is capable of executing multiple instructions at the same time, thereby increasing the speed at which a processor can execute a program.

Normally, in any particular program executed by a processor, a portion of the instructions control the flow of the program itself. These are typically referred to as control flow instructions. Examples of control flow instructions are branch instructions and loop maintenance instructions. Branch instructions cause a program to jump to another portion of a program or program memory. The address to which the branch instruction jumps may be an absolute address or an address relative to the current location in program memory. Some branch instructions are conditional such that the branch occurs only upon the occurrence of a predetermined condition or the setting of a flag in a predetermined manner. Loop maintenance instructions are those instructions which maintain the loop counters and the loop states. In today's processors, general purpose registers are used to maintain loop counters and loop states.

In prior art programming models, these control flow instructions are usually dependent on the data manipulations being performed by the computer system. Furthermore, the main execution cycles of the main arithmetic pipeline(s) are required to loop counters and states and to perform branches. Because the main arithmetic pipeline(s) are required to execute these control flow instructions, the time at which the main pipeline can perform data computations is reduced, thereby decreasing the throughput of data computations. It is desirable to relieve the main arithmetic pipelines from having to perform loop maintenance operations and control flow instructions, such that the main arithmetic pipelines can be used solely for data computations, thereby making the computation faster.

Another type of control instruction is a CASE instruction. A CASE instruction is a modified branch instruction which, upon execution, allows the program to jump to more than one location according to a predetermined number of conditions. In other words, upon executing a CASE instruction, if a first set of conditions is met, the program jumps to a first location; however, if a second set of conditions exists, the program jumps to a second location in the program memory instead, etc. CASE instructions are capable of supporting numerous conditional branches (e.g., 3, 4, 5, etc.).

In the prior art, when a CASE instruction is utilized in a program, all of the addresses (i.e., memory locations) corresponding to all of the possible branch locations are encoded into the instruction itself. For example, a CASE instruction supporting four possible branches to different memory locations would have four separate addresses (or address displacements) encoded into the instruction. The result of having memory addresses encoded into the instruction stream is a large instruction, which requires increased effort in decoding and execution and requires more space in a program memory. Because memory space is at a premium, it is desirable to use short instructions that require less space in program memory. It is also desirable to be able to invoke the function of a CASE instruction using an instruction of standard length. Moreover, when a CASE instruction is being executed, each condition must be evaluated in sequence to determine if the conditions am satisfied. The greater the number of conditions, the longer the time necessary to check all of the possible branching conditions to them required by the CASE instructions. Therefore, the execution of a CASE instruction requires multiple cycles to complete. It is desirable to be able to perform a CASE instruction in one cycle.

As will be shown, the present invention provides a method and means for performing a case instruction in a single cycle. The present invention also includes performing a case-type instruction without having to encode the addresses of all of the possible branch locations into the instruction itself.

SUMMARY OF THE INVENTION

A method and apparatus for executing a multi-alternative structure in a computer system is described. The computer system of the present invention executes multiple instructions, wherein condition indicators are set according to the execution of each instruction. The multi-alternative structure includes multiple branching options, which are conditioned.

The present invention includes a method and apparatus for selecting one of the multiple branching options according to the state of the requisite condition indicators as set forth in the multi-alternative structure. The present invention also includes a method and apparatus for implementing the chosen option, such that the computer system branches to the branch address associated with that option to continue execution of instructions, such that the multi-alternative structure is performed within one cycle.

BRIEF DESCRIPTION OF DRAWINGS

The present invention will be understood more fully from the detailed description given below and from the accompanying drawings of the preferred embodiments of the invention, which, however, should not be taken to limit the invention to the specific embodiments, but are for explanation and understanding only.

FIGS. 3A and 3B illustrate the currently preferred embodiment of the format of the instructions of the present invention.

DETAILED DESCRIPTION OF THE PRESENT INVENTION

A method and apparatus for selecting a branching location from multiple branching options according to a particular input is described. In the following description, numerous specific details are set forth, such as instruction formats, numbers of instruction bits, flags and conditions, etc., in order to provide a thorough understanding of the preferred embodiment of the present invention. It will be obvious to those skilled in the art that the present invention may be practiced without these specific details. Also, well-known circuits have been shown in block diagram form, rather than in detail, in order to avoid unnecessarily obscuring the present invention.

Overview of the Computer System of the Present Invention

Figure 1:
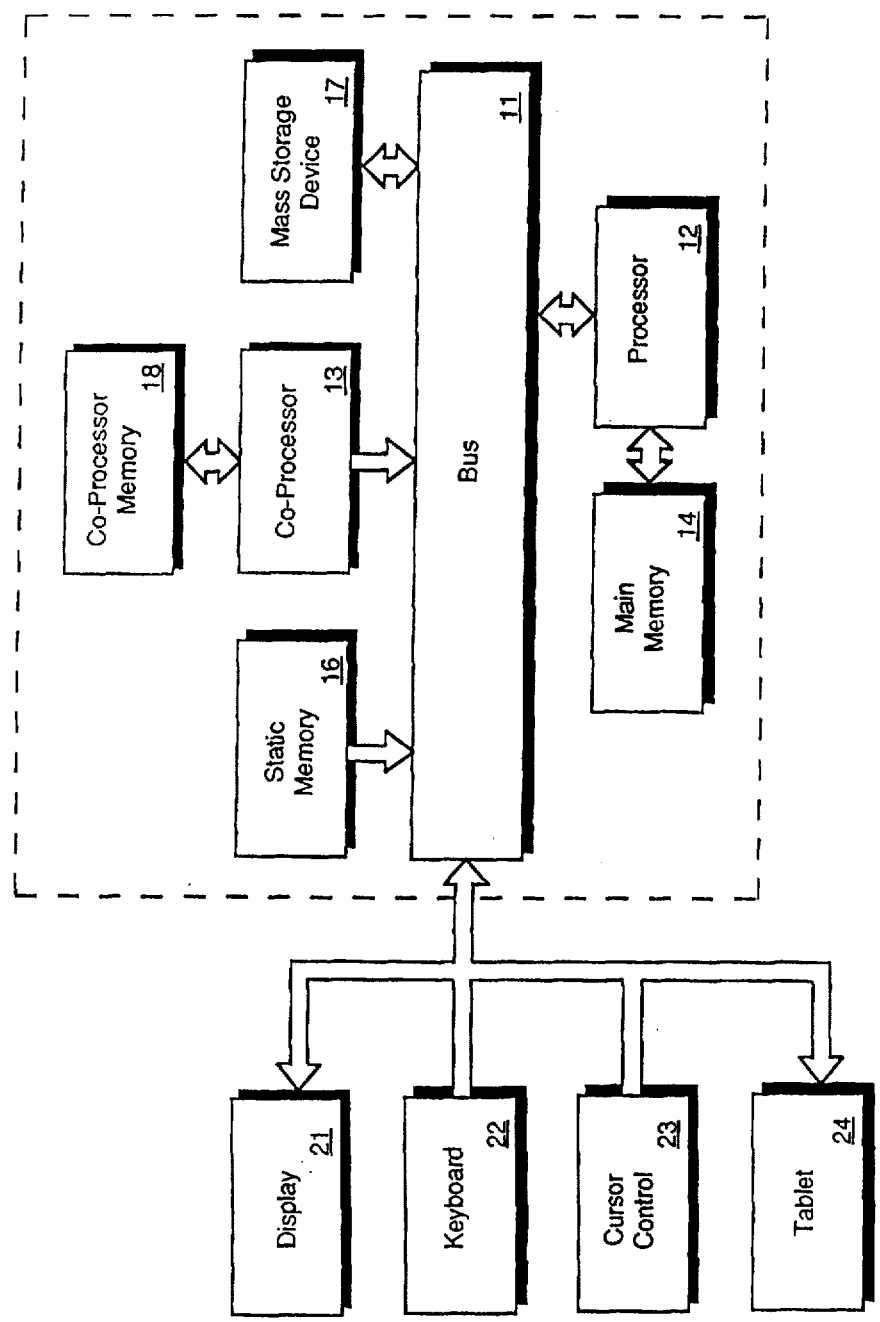
FIG. 1 is a block diagram of the computer system of the present invention.

FIG. 1 illustrates the computer system of the present invention. It will be understood that while FIG. 1 is useful for providing an overall description of the computer system of the present invention, a number of the details of the system are not shown. As necessary for disclosure of the present invention, further detail is set forth with reference to the other figures provided with this specification. Further, the present invention is described with reference to its preferred embodiment; alternative embodiments which may be conceived by one of ordinary skill in the art are considered within the scope of the claims set forth below.

Referring to FIG. 1, a pen-based computer system, as may be utilized by the preferred embodiment of the present invention, generally comprises a bus or other communication means 11 for communicating information, a processing means 12 (commonly referred to as a central processing unit, or CPU) coupled with bus 11 for processing information, a co-processing means 13 also for processing information, a random access memory (RAM) or other dynamic storage device 14 (commonly referred to as a main memory) coupled with bus 11 for storing information and instructions for processing means 12 and co-processing means 13, a read-only memory (ROM) or other non-volatile storage device 16 coupled with bus 11 for storing non-volatile information and instructions for processing means 12, a data storage device 17, such as a magnetic disk and disk drive, coupled with bus 11 for storing information and instructions, a display device 21, such as a cathode ray tube, liquid crystal display, etc., coupled to bus 11 for displaying information to the computer user, alpha-numeric input device 22 including alpha-numeric and other keys, etc., coupled to bus 11 for communicating information and command selections to processor 12 and a cursor control device 23 for controlling cursor movement, and a tablet 24 for inputting pen inputs into the computer system. Finally, the system includes a co-processing memory 18 coupled to co-processing means 13 for storing information and instructions for co-processing means 13.

Of course, certain implementations and uses of the present invention may not require nor include all of the above components. For example, in certain implementations, a keyboard or cursor control device for inputting information in a system may not be required. In other implementations, it may not be required to provide a display device for displaying information. Note that although the currently preferred embodiment of the computer system of the present invention is a pen-based system, the present invention is not limited to only pen-based computer systems and is applicable to numerous computer system implementations.

Block Diagram of the Co-Processor of the Present Invention

In the currently preferred embodiment, co-processor 13 is a handwriting recognition accelerator. Co-processor 13, in conjunction with processor 12, performs handwriting recognition by employing well-known voice and handwriting recognition algorithms. In the currently preferred embodiment, co-processor 13 is a metal-oxide semiconductor (MOS) integrated circuit.

Figure 2:
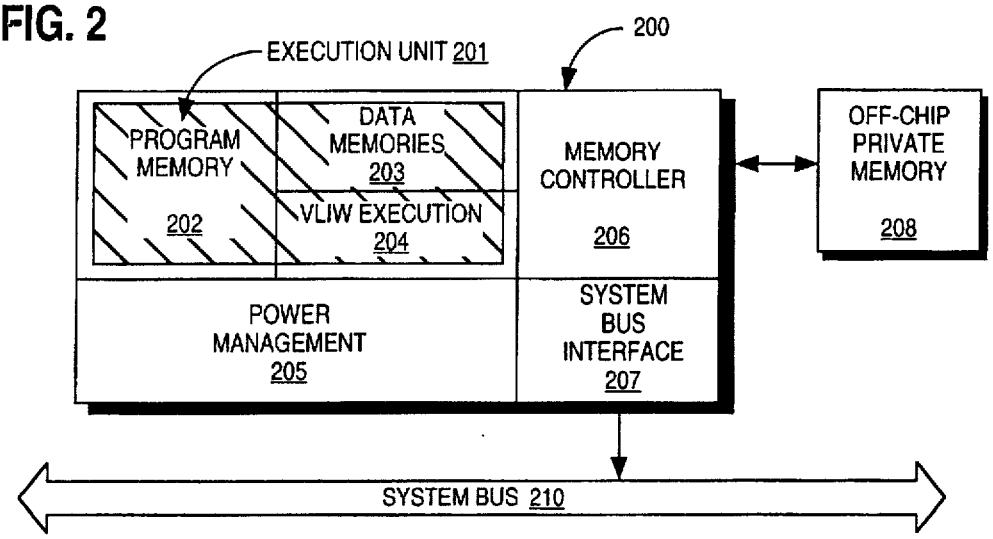
FIG. 2 is a block diagram of the co-processor of the present invention.

FIG. 2 illustrates the co-processor of the present invention. The co-processor of the present invention includes execution unit 201, power management unit 205, memory controller 206, and system bus interface 207. All the components of co-processor 200 are coupled together and communicate using control, address, and data lines in a manner well-known in the art. Co-processor 200 is shown coupled to system bus 210 via system bus interface 207 and coupled to off-chip memory 208 via memory controller 206.

Execution unit 201 comprises program memory 202, data memories 203, general purpose registers and execution logic 204 to perform data computations. In the currently preferred embodiment, execution unit 201 only executes integer computations because floating point are not required by the algorithms utilized in the handwriting recognition. In the currently preferred embodiment, these recognition algorithms are Dynamic Time Warping (DTW), and Hidden Markov Model (HMM). In the currently preferred embodiment, execution unit 201 is also programmable such that the algorithms may be changed. In other embodiments, depending on which algorithms are employed, execution unit 201 of the present invention may execute integer and floating point instructions and perform other necessary logic functions.

In the present invention, execution logic 204 of execution unit 201 includes multiple pipelines which are capable of executing three types of instructions: arithmetic logic unit (ALU) instructions and operations, pointer instructions and control flow instructions. In the presently preferred embodiment, execution unit 201 includes two ALU pipelines for executing arithmetic and logic operations on data located in the data memories and the general purpose registers, two pointer pipelines for providing addresses of data located in the data memories and for executing simple operations on these addresses, and one control flow pipeline for performing operations on its control registers, flags and condition bits in order to control the flow of the application program being executed. In the currently preferred embodiment, the control flow instructions are used to manage loop counters, to set and test flags, and to execute branching and call instructions.

Power management unit 205 performs the power management for co-processor 200. In the currently preferred embodiment, power management unit 205 places co-processor 200 in a low power consumption state when not currently in use.

Memory controller 206 interfaces co-processor 200 with off-chip memory 208 and controls transfers with data memories 203. Off-chip memory 208 is the co-processing memory of the computer system. In the currently preferred embodiment, memory controller 206 supports both static RAM (SRAM) and dynamic RAM (DRAM) memory chips. In the present invention, the interface between memory controller 206 and off-chip memory 208 includes address and data lines, row and column address strobe signals, write enable signal and parity signals. Other off-chip memory arrangements may require other signal interfaces.

System bus interface 207 performs data transfers between the CPU not shown) and co-processor 200 of the computer system (FIG. 1 ). In the currently preferred embodiment, these transfers are accomplished under the control of the CPU. In other words, in the currently preferred embodiment, co-processor 200 is a slave on system bus 210. System bus interface 207 also allows co-processor 200 to send interrupts to the CPU.

Of course, certain implementations and uses of the present invention may not require nor include all of the above components. For example, in certain implementations, a power management unit may not be required in co-processor 200.

Instruction Format of the Present Invention

In the currently preferred embodiment, co-processor 200 is a Very Large Instruction Words (VLIW) architecture. That is, in the currently preferred embodiment, many instructions are grouped together into wide instructions and issued in a single cycle. Each part of the wide instruction words controls a different pipeline in co-processor 200. In the present invention, the ability to achieve this type of parallelism using wide instructions is due, in part, to the nature of the recognition algorithms utilized by co-processor 200, which perform computations independent of branching routines and loop structures (i.e., the control flow) embedded within the program.

In the currently preferred embodiment, the width of the wide instruction word is 80 bits. Instructions are kept in program memory 202 which is loaded before the program begins from the off-chip memory 208 or from the disk or from the main memory of the computer system. The present invention also uses a 40-bit format for instructions. The most significant bit of the instruction defines its format. In the currently preferred embodiment, if the most significant bit is 0, the instruction is a short 40-bit format. However, if the most significant bit is a 1, the instruction is a long 80-bit format.

FIGS. 3A illustrates the 40-bit short format of an instruction. Referring to FIG. 3A, the short instruction comprises four fields. In the currently preferred embodiment, the first field comprises 1 bit, the second field comprises 7 bits, the third field comprises 27 bits and the fourth field comprises 5 bits. In the present invention, the first field indicates whether the instruction is a long or short instruction. Since FIG. 3A represents a short instruction, the bit in the first field is a zero. The following seven bits (i.e., the second field) represent a short control instruction. The twenty-seven bits (i.e., the third field) following the seven bits of the short instruction represent an ALU instruction. The last five (i.e., the fourth field) bits represent a pointer instruction.

FIG. 3B illustrates the 80-bit long format of the instruction. Referring to FIG. 3B, the currently preferred embodiment of the long instruction includes six fields. In the currently preferred embodiment, the first field comprises 1 bit, the second field comprises 15 bits, the third field comprises 27 bits, the fourth field comprises 5 bits, the fifth field comprises 27 bits and the sixth field comprises 5 bits. In the currently preferred embodiment, the first bit (i.e., the first field) is a 1 to indicate the long instruction format. The next fifteen bits following the first field (i.e., the second field) are a long control instruction. The third field represents an instruction for one of the ALU pipelines. The fourth field represents a pointer instruction for one of the pointer pipelines. The fifth field represents an instruction for the other ALU pipeline, and the sixth field is an instruction for the other pointer pipeline.

Short control instructions are used to initiate loops, to set up the control registers (CRs) and the condition bits in the control pipeline. Short instructions also allow the control of simple loops, like initialization loops for example. Long control instructions are used in the inner loops, to control the program flow and perform the branching and comparison operations of the control pipeline. In the currently preferred embodiment, all but two short control instructions are a subset of the long control instructions. The control instructions utilize control registers, which hold loop counters and branch addresses and displacements, flags and condition bits in the control pipeline for their execution.

In the currently preferred embodiment of the short and long control instruction format, the three bits following the first bit represent the opcode of the instruction, while the remaining bits specify the control registers, flags or condition bits required for execution. The currently preferred embodiments of both the short and long control instructions and their associated operation are included in Appendix A.

The Case Instruction

The case instruction is a special control flow instruction which, in response to a set of predetermined conditions, allows a program to branch to a selection of addresses. For example, if either condition 1, 2, 3, or 4 is met, the program branches to either address 1, address 2, address 3 or address 4, respectively.

The present invention uses condition bits produced within the control flow pipeline to facilitate execution of the case instruction. By using condition bits, the present invention is able to execute a case instruction in one cycle. In the currently preferred embodiment, the condition bits are flags. In the currently preferred embodiment, four condition bits are produced by the control flow pipeline. The condition bits can be used individually, to test a loop counter for example, or used in groups to generate state numbers. The state numbers represent the different labels of a case statement.

An example of the use of a case instruction can be illustrated from the four conditions depicted below:

Case A: $X \geq 0$ and $Y < 0$

Case B: $X < 0$ and $Y \geq 0$

Case C: $X \geq 0$ and $Y \geq 0$

Case D: X<0 and Y<0

Only two condition bits are required in the example above:

Cond0=X<0

Cond1=Y≧0

Table 1 below illustrates condition bit values for the example.

TABLE 1

| Case Number | COND1 | COND0 | Case Label |
|---|---|---|---|
| 0 | 0 | 0 | A |
| 1 | 0 | 1 | D |
| 2 | 1 | 0 | C |
| 3 | 1 | 1 | B |

The states of condition bits COND1 and COND0 define a register number in the control register. To implement the case instruction, the control registers must be initialized such that control register CR0 contains the address corresponding to Label A, control register CR1 contains the address corresponding to Label D, control register CR2 contains the address corresponding to Label C, and control register CR3 contains the address corresponding to Label B.

Control registers CR0–CR3 are initialized outside of the portion of the program encompassing the case instructions (i.e., the outer loop). The condition bits COND0 and COND1 need to be updated by the programmer every time X or Y changes value. A single case (i.e., COND1, COND0) instruction is capable of branching to the correct code (i.e., address) after each iteration depending on the new value of X and Y.

Therefore, in the present invention, condition bits are used to define the separate states which may result from execution. Then the states are mapped with a label (e.g. A, B, C, D, etc.). A number is assigned to each label. In the present invention, the number depicting each state indicates a distinct control register number.

At the beginning of the loop, the control registers are set up with all of the different labels, such that the initialization is performed only once. In this manner, the addresses associated with the available branching locations within the case instruction do not have to be encoded in the instructions. In the currently preferred embodiment, the control pipeline uses conditions to generate a number corresponding to a control register. The control register that corresponds to the state of the condition bits is read to obtain the address of the target, which is subsequently stored into the program counter in the control pipeline, such that a branch occurs to that address.

In the currently preferred embodiment, each instruction is capable of utilizing four condition bits. Therefore, up to sixteen labels can be associated with one case instruction. In this manner, in the present invention, a conditional jump can be set up to branch to sixteen separate locations upon the occurrence of sixteen distinct conditions or sets of conditions.

It should be noted that the condition bits can be generated by a program or can be loaded by a value of any flag in the processor. Thus, the condition bits can be loaded with any flag generated in the co-processor, such that any flag can be used in conjunction with the case instruction.

A case instruction removes the need for multiple conditional branches or multi-branch code. Using condition bits allows the present invention to implement a case instruction in which each condition is associated with a different address. By not having the addresses encoded within the code, the time to load each of the separate and distinct addresses is also avoided. In this manner, a case instruction can be executed in one cycle.

The Execution Unit of the Present Invention

Figure 4:
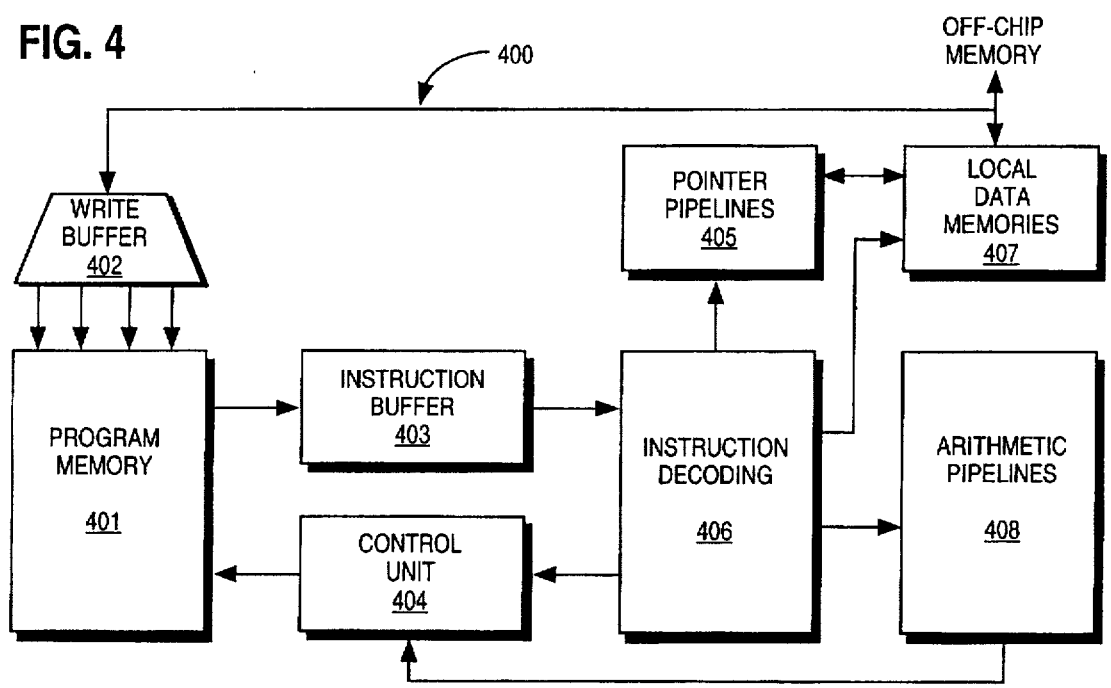
FIG. 4 is a block diagram of the execution unit of the present invention.

FIG. 4 is a block diagram of the execution unit of the present invention. Referring to FIG. 4, execution unit 400 comprises write buffer 402, program memory 401, instruction buffer 403, control unit 404, pointer pipelines 405, instruction decoder 406, local data memories 407, and arithmetic pipelines 408. The input to write buffer 402 is coupled to the off-chip memory (not shown). The output of write buffer 402 is coupled to program memory 401. Program memory 401 is also coupled to receive an output from control unit 404. Instruction buffer 403 is coupled to receive an output from program memory 401. The output of instruction buffer 403 is coupled to instruction decoder 406. Pointer pipelines 405, local data memories 407, arithmetic pipelines 408, and control unit 404 are all coupled to receive outputs from instruction decoder 406. Pointer pipelines 405 are also coupled to local data memories 407 for providing addresses to local data memories 407. Local data memories 407 are also coupled to arithmetic pipelines 408 for exchanging data. Local data memories 407 also receive and send data to off-chip memory. Control unit 404 is also coupled to receive an output from the arithmetic pipelines 408. It should be noted that the lines depicted in FIG. 4 may represent more than one conductor.

Program memory 401 stores the instructions of the application to be executed by the execution unit of the present invention. Program memory 401 is loaded with the instructions from off-chip memory via write buffer 402. Instructions are read out of program memory 401 and routed to instruction buffer 403. Instruction buffer 403 holds the instructions and, in conjunction with instruction decoder 406, decodes the instructions, sending the commands to the different pipelines (i.e., pointer pipelines 405, arithmetic pipelines 408, and control unit 404). In other words, control instructions are sent to control unit 404, pointer instructions are sent to pointer pipelines 405, and arithmetic instructions are sent to arithmetic pipelines 408. In the currently preferred embodiment, control flow pipeline 404 executes control flow instructions. The pointer pipelines 405 generate addresses of operands and results in data memories 407. In the currently preferred embodiment, arithmetic pipelines 408 execute integer operations using operands from the general purpose registers and data memories 407.

Since there are two instruction formats in the currently preferred embodiment (i.e., an 80-bit format and a 40-bit format), instruction buffer 403 must extract the instruction fields from the lines of program memory 401 according to the proper format. In the present invention, instruction buffer 403 and instruction decoder 406 use multiplexers to separate and decode the individual control, pointer and ALU instructions, such that they can be distributed to their respective pipelines.

From the control flow instruction, instruction decoder 406 provides the read and write addresses of the control register file, the source and destination operands for the control flow pipe operator, the opcode for the control flow operator, indications regarding whether to write to the program counter, and instruction decoder 406 provides flag selection.

In the currently preferred embodiment, arithmetic pipelines 408 comprise two identical arithmetic pipelines. Arithmetic pipelines 408 utilize local data memories 407 and a general purpose register file to perform data computations (i.e., ALU operations). In the currently preferred embodiment, these data computations correspond to the application of handwriting recognition routines to input data. In the currently preferred embodiment, all operations are accomplished with 16-bit operands and results, with the exception of the multiply operation which produces a 32-bit result. Furthermore, all ALU operations are executed in a single cycle.

Pointer pipelines 405 provide the addresses of operands and results in data memories 407. In the currently preferred embodiment, data memories 407 comprises two separate memories and pointers pipelines 405 comprise two pointer pipelines, one for each data memory in local data memories 407. Pointer pipelines 405 also execute arithmetic instructions on the pointers.

Control unit 404 comprises the control flow pipeline of the present invention. The control flow pipeline executes the control flow instructions. In the currently preferred embodiment, all control flow instructions are executed in a single cycle. The control flow pipeline is completely independent of the pointer pipelines 405 and the arithmetic pipelines 408 in that the control flow pipeline has its own register file, containing control registers and its own arithmetic operator for performing simple operations, such as addition and subtraction on the control registers, and its own flags. The control flow pipeline also contains the program counter. In prior art systems, the control flow instructions and loop maintenance is accomplished using the arithmetic pipelines due to the dependencies which occur between the data computations and the loop maintenance and/or branch instructions. Due to the independence between the data computations and the control flow operations in the handwriting recognition algorithms performed by co-processor of the present invention, the control flow instructions and loop maintenance instructions do not rely on the data computations performed by the arithmetic pipelines. Therefore, the control instructions may be executed separately from the data computations performed by the arithmetic pipelines. By operating separately, the control flow pipeline of the present invention may operate in parallel with pointer pipelines 405 and arithmetic pipeline 408.

In the present invention, the control registers (CRs) are typically used as loop counters. Arithmetic operations are executed on the control registers. The values in the control registers are updated each time a loop is executed. The values in the control registers can be compared between themselves or to some other value to determine conditions upon which branch operations may be taken.

The control flow pipeline is also responsible for generating flags and condition bits which are used with branch instructions. The flags are set as a result of the operations performed by all of the pipelines. The condition bits are set as a result of the operations performed by the arithmetic operator of the control flow pipeline. The flags are used by conditional branch instructions to determine whether or not to branch. In the present invention, control unit 405 is capable of generating its own condition bits, which do not depend on any other units (i.e., the arithmetic pipelines; the pointer pipelines) for the generation. The control flow pipeline is also capable of using flags produced by all of the different pipelines in the execution unit. In the currently preferred embodiment, all of the flags are stored in a flag register.

Figure 5:
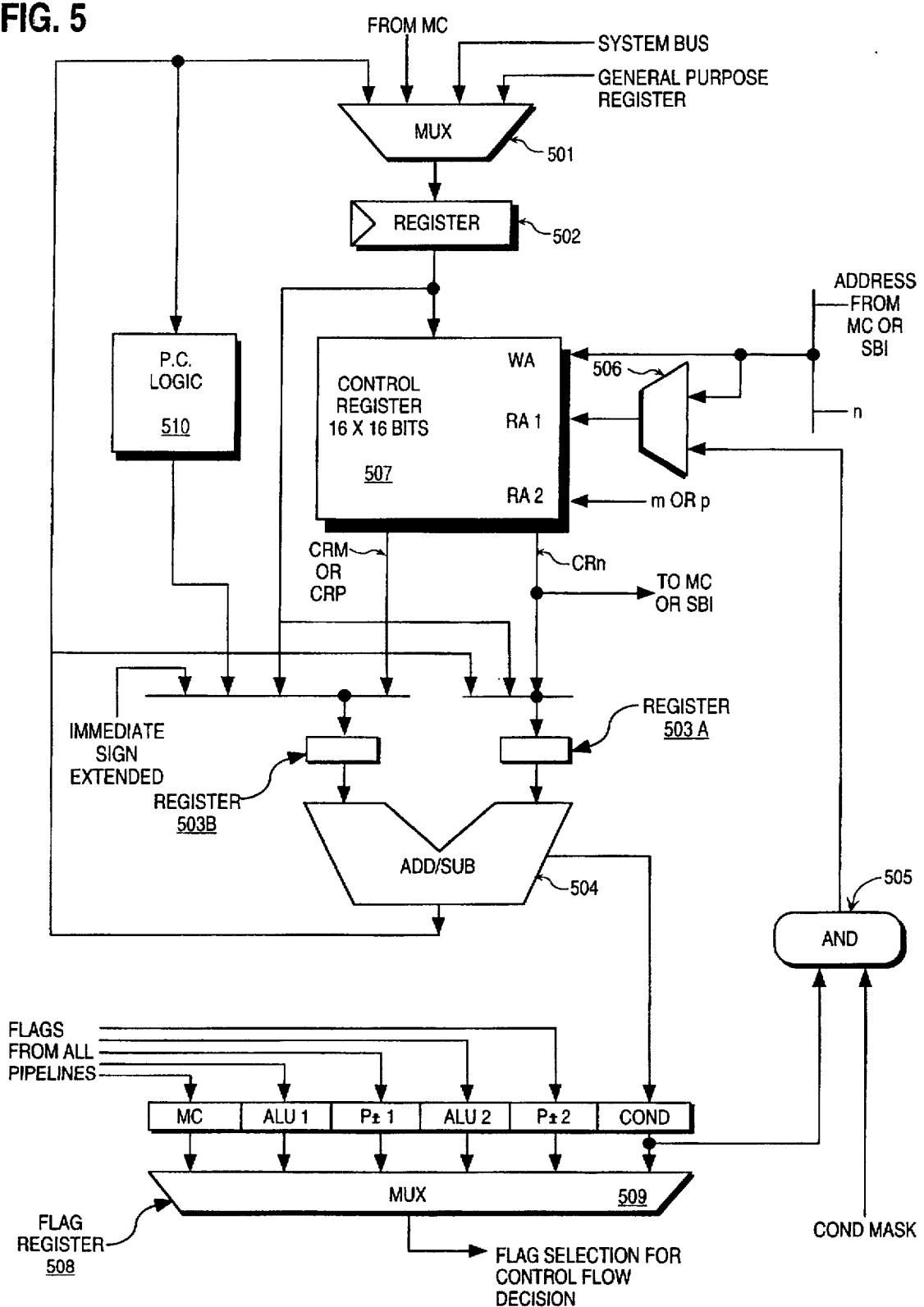
FIG. 5 is a data flow diagram of the control flow pipeline.

A block diagram of the control flow pipeline and the data flow in the control unit are shown in FIG. 5. Referring to FIG. 5, control flow pipeline comprises multiplexers (MUX) 501, 506, and 509, clocked registers 502, 503A and 503B, control register file 507, arithmetic operator 504, AND logic gate 505, flag register 508, and program counter (PC) logic 510.

MUX 501 is coupled to receive the data output of arithmetic operator 504, an input from the main memory of the computer system, an input from the system bus, and an input from the general purpose registers used by the arithmetic pipelines. The output of MUX 501 is coupled to and clocked into register 502. Register 502 is also coupled to an input of control register file 507.

Control register file 507 has three address ports: two read ports and one write port. Control register file 507 is coupled to receive an address from the main memory, via memory control (MC), or the system bus interface on its write address (WA) port. Control register file 507 is also coupled to receive two read address inputs from the output of MUX 506 and the instruction decoder on its two read ports RA1 and RA2 respectively. MUX 506 is coupled to receive an address from the main memory or the system bus interface and the output of the AND gate logic 505.

Control register file 507 is also coupled to registers 503A and 503B. Register 503B is also coupled to receive an output from register 502, an output from PC logic 510, an output arithmetic operator 504 and the immediate sign extended. The immediate sign extended comprises a constant value which is encoded into an instruction (e.g., the 4 in the instruction $CR_n=CR_n+4$). Register 503A is also coupled to receive the output of arithmetic operator 504 and an output from register 502. The data in control register file 507 is also read out by the main memory via memory control (MC) or devices on the system bus using one of the data ports. The inputs of arithmetic operator 504 are coupled to receive the operands from the registers 503A and 503B for execution. An output of arithmetic operator 504 is coupled to PC logic 510.

The condition bits are output from arithmetic operator 504 to the condition bit field of flag register 508. The flags from all the other pipelines are also inputted and stored into the flag register 508. In the currently preferred embodiment, flag register 508 comprises flags from the memory controller (MC), the arithmetic pipelines (ALU1, ALU2), the pointer pipelines (PT1 and PT2) and the condition bits from arithmetic operator 504. All of the flags from all the pipelines and the condition bits are coupled to be received by MUX 509 which outputs the proper flag for the control flow decision according to the instruction being executed. The condition bits from flag register 508 are also coupled to one of the inputs of AND gate logic 505. The other input to AND gate logic 505 is coupled to the condition mask bits of the instruction.

The control register file 507 is loaded from MUX 501 via register 502. In the currently preferred embodiment, control register file 507 comprises sixteen 16-bit registers. Control register file 507 can be loaded from the system bus and communicate with the host CPU main memory through the system bus. Using the system bus inputs, the CPU or other devices are able to write into the control registers. In the currently preferred embodiment, the CPU has control over all internal and external memory of the co-processor chip and can be utilized to initialize the control flow pipeline. In the present invention, the CPU initializes the control register file 507 with predetermined values at certain times during the operation of the computer system. For instance, when the computer system has been shut down or placed into a suspended state from which the computer system must resume, the CPU initializes the control registers with their last known executable state or predetermined values upon power up.

Control registers 507 can also be loaded from main memory. In the currently preferred embodiment, control registers 507 are loaded from the main memory of the computer system when the co-processor and/or the computer system is returning from a suspended state or a powered down state. Control registers 507 can be loaded with the values in the general purpose registers. In this manner, the control pipeline can also operate on data produced by the arithmetic pipeline. In the currently preferred embodiment, the control registers 507 are loaded from the general purpose registers when a control operation comprises either a loop maintenance or control flow operation which is too sophisticated for the control flow pipeline, such that the arithmetic unit must complete the operation during initialization and the transfer of the results to control register file 507 for the control flow pipeline to continue. Control registers 507 can also be loaded from the memory controller (MC).

The control flow pipeline operates on the decoded instruction from the instruction buffer and the instruction decoder. The instruction decoder obtains the opcode and indicates what operation is to be performed to arithmetic operator 504. The results of the decoding also indicate to registers 503A and 503B which operands to obtain for arithmetic operator 504. Registers 503A and 503B latch the data from its source. In the currently preferred embodiment, the data can be latched from the control registers in control register file 507, from register 502, from the program counter, from the output of arithmetic operator 504 and from the instruction itself as a constant (e.g., from the immediate sign extended). Thus, the decoding of the instruction indicates from where the operands of the operation should be read.

Note that for read operations to the control registers in control register file 507, the data is accessed through addresses presented on read ports RA1 and RA2. In the currently preferred embodiment, the read addresses are either encoded in the last three fields of the instruction, are addresses generated as a result of the execution of a case instruction, via MUX 506 and AND gate 505 or are from an off-chip source. Addresses encoded into the control instruction to access control registers are received by read port RA2. In the currently preferred embodiment, data is read out to the main memory or system bus using an address input at read port RA1, via MUX 506. Likewise, data is written into the control registers using an address on the write address (WA) port of the control register file 507.

Arithmetic operator 504 performs the adding and subtracting operations dictated by the decoded instruction and writes the results according to the description in the instruction. The results generated by arithmetic operator 504 may be written to PC logic 510, either of registers 503A or 503B, or to a particular control register, via MUX 501 and register 502, as specified in the instruction. If the resulting data is to be written to a register in control register file 507, the control register is accessed according to address (n) from the control instruction on the WA port of control register file 507.

The execution of some operations by arithmetic operator 504 produces condition bits in the present invention. In the currently preferred embodiment, four condition bits are generated. The condition bits are output to flag register 508, which also receives the other flags from the remainder of the computer system. As the flags and condition bits are utilized in determining whether a branch should be taken, the decoded instruction indicates to MUX 509 which bit or bits from flag register 508 is to be examined. In response, MUX 509 outputs the flag or condition bits designated in the instruction to resolve the control flow decision. The bit value is sent to the program counter, along with any data generated and output from arithmetic operator 504.

The control unit of the execution unit includes the program counter for the co-processor of the computer system. Using the data and any pertinent flag, the control unit is able to keep track of the program counter. In the currently preferred embodiment, the program counter is updated every clock. Also in the currently preferred embodiment, the control registers in control register file 507 can be used for providing a displacement in the program, wherein the current program counter can be added to a value in a particular control register using arithmetic operator 504 to obtain a new address (i.e., the new location of the program counter). The control registers can also contain an absolute address of where a program is to branch. One example of the use of an absolute address is in the execution of a case instruction where a list of addresses, which are labeled in the control registers, determine the location of the program counter.

Figure 6:
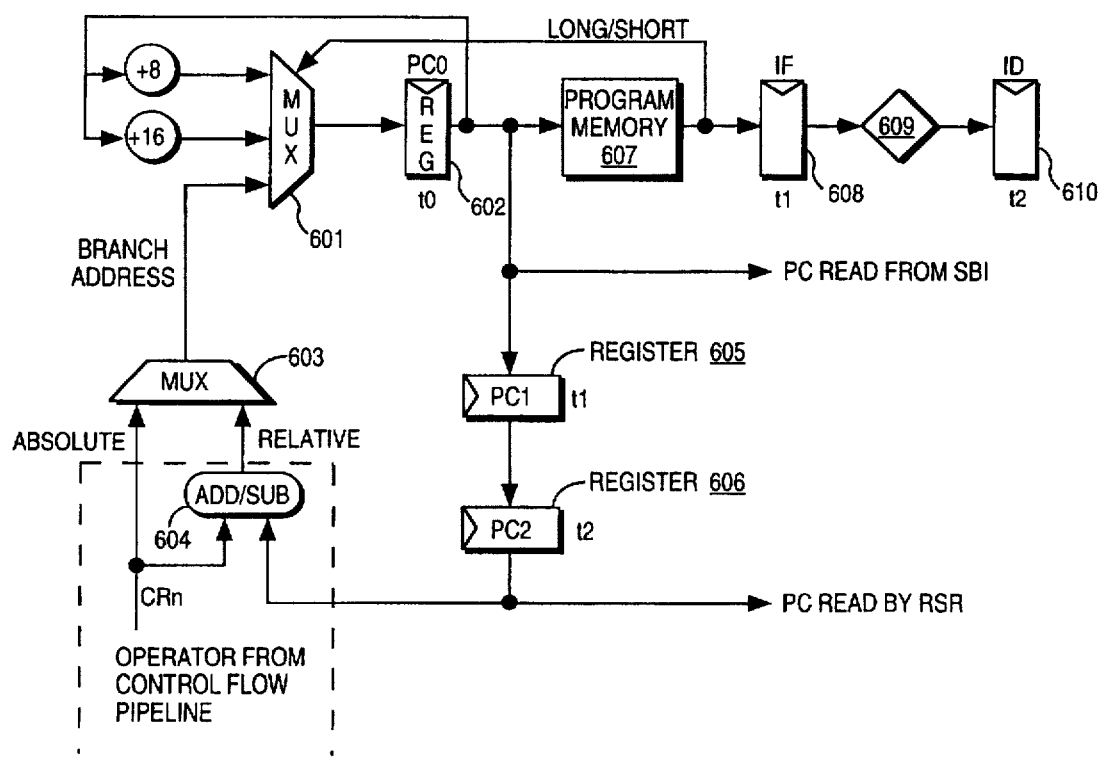
FIG. 6 a block diagram of the program counter logic of the present invention.

The currently preferred embodiment of the PC logic 600 is shown in FIG. 6. Referring to FIG. 6, MUXs 601 and 603, PC0 register 602, PC1 register 605, PC2 register 606, instruction fetch (IF) register 608, instruction decode (ID) register 610, program memory 607 and decoding stage 609 are shown. MUX 601 is coupled to receive a +8 input address, a +16 input address and the branch address output from MUX 603. The output of MUX 601 is coupled to PC0 register 602. PC0 register 602 is the program counter and is coupled to program memory 607, PC1 register 605, and can be read by the system bus interface via line 621. The value of PC0 register 602 is also fed back and increased by 8 or 16. The newly computed address is then input into MUX 601. The output of program memory 607 is coupled to IF register 608 and an indication as to whether the instruction fetched was long or short is also looped back, such that MUX 601 can select the proper address for the program counter (which is read into PC0 register 602). Note that the instruction in IF register 608 corresponds to the address in PC1 register 605.

The IF register 608 is also coupled to decoding stage 609. The results output from decoding stage 609 is coupled to the ID register 610. The output of ID register 610 is sent for execution. The PC1 register 605 is coupled to PC2 register 606. Note that the address in PC2 register 606 corresponds to the instruction in ID registers 610. The output of PC2 register 606 is coupled to the arithmetic operator of the control flow pipeline. The arithmetic operator of the control flow pipeline is also coupled to receive an operator from the control registers (CRm). MUX 603 supplies the branch address to MUX 601. MUX 603 receives both the absolute and relative address outputs from the control flow pipeline and outputs either depending on the instruction. For instance, if a case instruction is being executed, MUX 603 would select the absolute address as the input into MUX 601.

The PC logic shown in FIG. 6 illustrates the relationship between the program counter and the control flow pipeline. The program counter in PC0 register 602 is used to obtain the new instruction from program memory 607. In the currently preferred embodiment, the writing of an address into PC0 register 602 triggers the execution unit of the co-processor to start the execution of the program located at the address written into PC0 register 602. While this occurs, the previous instruction as indicated by the address in PC1 register 605 is in the IF register 608 and awaits decoding. Also when the program counter PC0 register 602 is loaded, the instruction two stages ahead of the current PC, as indicated by the address in PC2 register 606, is in the ID register 610.

The PC is loaded according to the previous instruction. If the previous instructions were a branch instruction, then MUX 601 would supply the branch address to PC0 register 602. Note that the target of a branch may be the address of a long instruction, the addresses of the first instruction of a pair of short instructions, or the address of a second instruction of a pair of short instructions. Whether the branch address supplied is an absolute address, such as one generated as a result of the execution of a case instruction, or an address relative the address of the previous PC depends on the results of the execution. Note that the address in PC2 register 606 is used for computations of branch addresses in the case of relative branches. If the previous instruction was not a branch instruction, then the long/short indication output from program memory 607 indicates whether the last instruction fetch was a long or short format instruction. Depending on the indication, the PC is incremented by the proper address displacement (i.e., +8 or +16), such that the PC in PC0 register 602 is updated. Note that in the present invention there are three copies of the program counter corresponding to the first three stages of the pipeline (i.e., PC0, PC1 and PC2). In the currently preferred embodiment, all of the program counters are byte addresses that are 16 bits wide.

The Execution of a Case Instruction

As discussed above, prior to the execution of a case instruction, the control registers in the control flow pipeline are initialized with the addresses of the different pieces of code associated with each possible state tested in a case statement. In other words, a label corresponding to a state number is associated with one of the control registers. As the program is executed, condition bits are set by the operator of the control flow pipeline. These condition bits are stored in the flag register. In one embodiment, a condition decoder could be used to decode the condition bits in a manner well-known in the art. Depending on the state defined by the condition bits at the time a case instruction is executed, a control register is chosen which outputs the target address (i.e., the branch address) for the program counter.

An example using a case instruction is given below. The example shown is in high level code:

| | |
|---|---|
| If (a<b) and (a<c) then d1 = (b-a) + (c-a) | /* case 1 */ |
| else if (b<a) and (b<c) then d2 = (a-b) + (c-b) | /* case 2 */ |
| else if (c<a) and (c<b) then d3 = (a-c) + (b-c) | /* case 3 */ |

Each of the condition bits is associated with an equality. A truth table for the inequality is shown below.

| | Cond 2<br>a<b | Cond 1<br>a<c | Cond 0<br>b<c |
|---|---|---|---|
| Case 1: | 1 | 1 | 0 or 1 |
| Case 2: | 0 | 0 or 1 | 1 |
| Case 3: | 0 or 1 | 0 | 0 |

Each of the separate cases is then associated with a control flow register. For instance:

| State Number | Case Number |
|---|---|
| 6 and 7 | Case 1 |
| 1 and 3 | Case 2 |
| 0 and 4 | Case 3 |

An example of the pseudo code for the example is given below. Initially, the control registers are initialized with the addresses of the different pieces of code associated with each state number:

```
CR6 = &Label_Case1;
CR7 = &Label_Case1;
CR1 = &Label_Case2;
CR3 = &Label_Case2;
CR0 = &Label_Case3;
CR4 = &Label_Case3;
Loop_address:
    /* read new value of a, b and c in memory */
    get (a, b, c)
    /* evaluation of the condition bits */
    Cond 0 = (a<b);
    Cond 1 = (a<c);
    Cond 2 = (b<c);
    /* use the case instruction to branch to the right code directly */
    Case (cond0, cond1, cond2);
    /* cod for the different cases */
Label_Case1: compute d1;
    loop over n;
Label_Case2: compute d2;
    loop over n;
Label_Case3: computer d3;
    loop over n;
```

Upon the execution of the instructions (highlighted in bold above), condition bits are set and stored in the flag register. When a case instruction is executed, AND gate 505 performs a logical AND between the condition bits and the condition bit mask, which is encoded in the case instruction. The condition bit mask is set according to the instruction to provide the requisite condition bits to address the control register. In the currently preferred embodiment, the output of AND gate 505 is 4 bits. After ANDing the condition bit mask and the condition bits, control register file 507 is accessed, via read port RA1, with the bits from AND gate 505. In other words, the state numbers and the control registers are related, such that they may be accessed. The data, which corresponds to the address for the branch, is latched and passed through arithmetic operator to PC logic 510 in order to update the program counter. In this manner, the case instruction is executed in one cycle.

Note that although the currently preferred embodiment uses four condition bits and sixteen control flow registers for holding addresses, any number of condition bits and control registers may be used. Also note that the addresses of the different pieces of code to be executed could be stored in a general purpose register file or on-chip memory, instead of the control registers.

Whereas many alterations and applications of the present invention will no doubt become apparent to a person of ordinary skill in the art after having read the foregoing description, it is understood that the particular embodiment shown and described by illustration is in no way intended to be limiting. Therefore, reference to details of the preferred embodiment are not intended to limit the scope of the claims which themselves recite only those features regarded as essential to the invention.

Thus, a method and apparatus for branching to one of a plurality of branching locations according to a predetermined condition has been described.

APPENDIX A
Short Control Instructions

| Short Control Instruction Format | | |
|---|---|---|
| 1 bit | 3 bits | 4 bits |
| 0 | Opcode | CRn |
| 0 | 000 CRn = CR0 | CRn |
|   | 001 CRn = Immediate(*) | |
|   | 010 CRn = Regf(*) | |
|   | 011 CRn = CRn − 1 | |
|   | 100 Cond0 = (CRn ==0) | |
|   | 101 Branch Absolute (if Cond0) CRn | |
|   | (*) Regf and Immediate are fields of the ALU instruction. | |
| 0 | 110 Cond0 = Flag n | Flag n |
| 0 | 111 Case (Cond Mask) | Cond Mask |

CRn=CRn−1

This instruction decrements the control register CRn by one. Flags NC (Negative in Control Pipe) and ZC (Zero in Control Pipe) are affected. In the currently preferred embodiment, the register specifier n is a number from the set [0 . . . 15], representing one of the 16 control registers.

CRn=Immediate

The control register CRn is loaded with the 16 bit immediate field of the ALU instruction. No flags are affected. No ALU or pointer instructions can be grouped with this control instruction. In the currently preferred embodiment, this control instruction must be by itself in a short control instruction. The register specifier n is a number from the set [0 . . . 15]. With long control instructions, one can load immediate values in a control register, but these immediate values are 8 bit wide.

CRn=Regf

The control register CRn is loaded with the content of the general purpose Regf. The general purpose register Regf is specified in the ALU instruction (which has to be an ALU1 instruction). Flags NC and ZC are affected. In the currently preferred embodiment, the general purpose register specifier Regf is a number in the set [0 . . . 15], and the register specifier n is a one number from the set [0 . . . 15].

Cond0=(CRn==0)

The content of the control register CRn is compared to 0. If CRn is equal to 0, the condition bit Cond0 (Condition Bit 0) is set to 1. If CRn is different from 0, the condition bit Cond0 is reset to 0. In the currently preferred embodiment, the register specifier n is a number from the set [0 . . . 15]. In the currently preferred embodiment, this instruction can only be a short control instruction.

CRn=CR0

The control register CRn is loaded with the content of control register CR0. In the currently preferred embodiment, register specifier n is a number from the set [0 . . . 15]. No flags are affected. If n is equal to 0, this instruction is a nop.

Cond0=Flag n

The condition bit Cond0 is set to 1 if flag n is 1, and reset to 0 if flag n is 0. Note that in the currently preferred embodiment only the first 16 flags can be used in this instruction.

Branch Absolute (if Cond0) CRn

If the condition bit 0 is set to 1, the program counter PC is loaded with the content of the control register CRn. If the condition bit 0 is equal to 0, the branch is not executed, and the program counter PC is incremented normally. In the currently preferred embodiment, the register specifier n is a number from the set [0 . . . 5].

Case (Cond Mask)

The four condition bits are ANDed with the mask Cond Mask, which is the last field of this instruction to give a 4 bit index I which addresses the control registers. The program counter is loaded with the content to the control register CR1. I=Cond[3 . . . 0]& Cond Mask. PC=CR1. Index I is a number from the set [0 . . . 15].

Long Control Instructions

| | Long Control Instruction Format | | | | |
|---|---|---|---|---|---|
| Format | 1 bit | 3 bits | 3 or 4 bits | 5 or 4 bits | 4 bits |
| Format 1 | 1 | 0xx | CRm | Cond p | CRn |
| Format 2 | 1 | 10x | 8-bit integer | | CRn |
| Format 3 | 1 | 110 | 000x | CRp (4 bits) | CRn |
| Format 4 | 1 | 110 | xx1 | Flag q (5 bits) | Cond n |
| Format 5 | 1 | 110 | 111 | | Cond Mask |
| Format 6 | 1 | 111 | xxx | Flag q (5 bits) | CRn |

The following table specifies, for each format, the opcodes and the corresponding instructions in the currently preferred embodiment. Note that the opcode width is different for each type of format.

| Long Control Instruction Opcode Specification | | |
|---|---|---|
| Format | Opcode | Instruction |
| Format 1 | 000 | Cond p = (CRn == CRm) |
|  | 001 | Cond p = (CRn != CRm) |
|  | 010 | Cond p = (CRn < CRm) |
|  | 011 | Cond p = (CRn >= CRm) |
| Format 2 | 100 | CRn = CRn + signed_integer |
|  | 101 | CRn = signed_integer |
| Format 3 | 1100000 | CRn = Regf |
|  | 1100001 | CRn = CRp |
| Format 4 | 110001 | Cond n = Flag q |
|  | 110011 | Set Cond q |
|  | 110101 | Reset Cond q |
| Format 5 | 110111 | Case (Cond Mask) |
| Format 6 | 111000 | Branch Relative (if Flag q) (PC + CRn) |
|  | 111001 | Branch Relative (if not Flag q) (PC + CRn) |
|  | 111010 | Branch Absolute (if Flag q) (CRn) |
|  | 111011 | Branch Absolute (if not Flag q) (CRn) |
|  | 111100 | Call (if Flag q) (CRn) |
|  | 111101 | Call (if not Flag q) (CRn) |
|  | 111110 | Halt |
|  | 111111 | Nop |

In the currently preferred embodiment, the instructions of format 1 and format 4 involve the condition bits, where the names of the condition bits are Cond0 Cond1, Cond2 and Cond3, but the corresponding values of the fields p, n and q are 1, 2, 3, and 4.

Cond p=(CRn==CRm)

Condition bit p is set to 1 if CRn is equal to CRm. If CRn is different from CRm, condition bit p is reset to 0. In the currently preferred embodiment, register specifier m, n are numbers from the set [0 . . . 15] and condition bit p is from the set [0 . . . 3].

Cond p=(CRn!=CRm)

Condition bit p is set to 1 if CRn is not equal to CRm. If CRm, condition bit p is reset to 0. In the currently preffered embodiment, register specifier m, n are numbers from the set [0 . . . 15] and condition bit p is a number from the set [0 . . . 3].

Cond p=(CRn<CRm)

Condition bit p is set to 1 if CRn is less than CRm. If CRn is equal to or greater than CRm, condition bit p is reset to 0.

In the currently preferred embodiment, register specifier m, n is a number from the set [0 ... 15] and condition bit p is in the set [0 ... 3].

Cond p=(CRn>=CRm)

Condition bit p is set to 1 if CRn is equal to or greater than CRm. If CRn is less than CRm, condition bit p is reset to 0. In the currently preferred embodiment, register specifier m, n are each a number from the set [0 ... 15] and condition bit p is in the set [0 ... 3].

CRn=CRn+signed integer

The 8 bit integer field is signed extended and added to the content of CRn. The result is written in the control register CRn. Flags NC and ZC are affected. In the currently preferred embodiment, register specifier n is a number from the set [0 ... 15].

CRn=signed integer

The 8 bit integer field is signed extended and written into the control register CRn. No flags are affected. In the currently preferred embodiment, register specifier n is a number from the set [0 ... 15].

CRn=Regf

The control register CRn is written with the content of the general purpose register Regf. The general purpose Regf is specified in the ALU1 instruction. Flags NC and ZC are affected. In the currently preferred embodiment, specifier Regf is a number in the set [0 ... 15], and the register specifier n is a number from the set [0 ... 15].

CRn=CRp

The control register CRn is written with the content of the control register CRp. No flags are affected. In the currently preferred embodiment, register specifer p and n are from the set [0 ... 15].

Cond n=Flag q

Condition bit n is set to 1 if flag q is equal to 1, condition bit n is reset to 0 if flag q is equal to 0. In the currently preferred embodiment, condition bit specifier n is in the set [0 ... 3] and flag specifier q is in the set [0 ... 26]

Set Cond q

Condition bit q is set to 1. In the currently preferred embodiment, condition bit specifier q is a number from the set [0 ... 3].

Reset Cond q

Condition bit q is reset to 0. In the currently preferred embodiment, condition bit specifier q is a number from the set [0 ... 3].

Case (Cond Mask)

The four condition bits are ANDed with the mask Cond Mask to give a 4-bit index I. The program counter is loaded with the content of the control register CR1. Index I=Cond[3 ... 0]& Cond Mask. PC=CR1.

RELATIVE BRANCHES are relative to the branch instruction itself. In the following description, PC is the address of the branch instruction.

Branch Relative (if Flag q) (PC+CRn)

If Flag q is set to 1, the content of control register CRn is added to the program counter PC. If the Flag q is not set to 1, the program counter is incremented normally. In the currently preferred embodiment, flag specifier q is in the set [0 ... 26] and the register specifier n is in the set [0 ... 15].

Below is a table showing the list of flags available for branch instructions, and the currently preferred embodiment of their corresponding coding in the field Flag q. Note that in the currently preferred embodiment, the coding 00000 in the flag q field means that no flag is tested, and the branch instruction is unconditional. This is true for all flavor of branch and call instructions in the currently preferred embodiment. Note that flags and condition bits are different.

In the currently preferred embodiment, condition bits are a sub-set of all available flags.

Flags

| Coding | Mnemonic | Name |
|---|---|---|
| 00000 | True | True Flag (Unconditional) |
| 00001 | Cond0 | Condition Bit 0 |
| 00010 | Cond1 | Condition Bit 1 |
| 00011 | Cond2 | Condition Bit 2 |
| 00100 | Cond3 | Condition Bit 3 |
| 00101 | NC | Negative in Control Pipe |
| 00110 | ZC | Zero in Control Pipe |
| 00111 | ZP1 | Zero in Pointer 1 |
| 01000 | CP1 | Carry in Pointer 1 |
| 01001 | ZP2 | Zero in Pointer 2 |
| 01010 | CP2 | Carry in Pointer 2 |
| 01011 | MC0 | Done Signal Memory Controller 0 |
| 01100 | MC1 | Done Signal Memory Controller 1 |
| 01101 | Timer 1 | Done Signal Timer 1 |
| 01110 | Timer 2 | Done Signal Timer 2 |
| 01111 | | Reserved |
| 10000 | N1 | Negative in ALU1 |
| 10001 | Z1 | Zero in ALU1 |
| 10010 | CIN1 | Carry in ALU1 |
| 10011 | O1 | Overflow in ALU1 |
| 10100 | MM1 | Min Max in ALU1 |
| 10101 | N2 | Negative in ALU2 |
| 10110 | Z2 | Zero in ALU 2 |
| 10111 | CIN2 | Carry in ALU2 |
| 11000 | O2 | Overflow in ALU2 |
| 11001 | MM2 | Min Max in ALU2 |
| 11010–11111 | | Reserved |

Branch Relative (if not Flag q) (PC+CRn)

If Flag q is reset to 0, the content of control register CRn is added to the program counter PC. In the currently preferred embodiment, the flag specifier q is in the set of [0 ... 26]. In the currently preferred embodiment, condition bit specifier n is in the set [0 ... 15].

Branch Absolute (if Flag q) (CRn)

If Flag q is set to 1, the program counter PC is loaded with the content of control register CRn. If Flag q is 0, the program counter is incremented normally. In the currently preferred embodiment, the flag specifier q is in the set [0 ... 26], and the register specifier is n is in the set [0 ... 15].

Branch Absolute (if not Flag q) (CRn)

If Flag q is reset to 0, the program counter PC is loaded with the content of control register CRn. If Flag q is 1, the program counter is incremented normally. In the currently preferred embodiment, the flag specifier q is in the set [0 ... 26], and the register specifier n is in the set [0 ... 15].

Call (if Flag q) (CRn)

If Flag q is set to 1, the program counter PC is loaded with the content of control register CRn, and the address to return to after completion of the sub-routing is stored in CR0. If Flag q is 0f, the program counter is incremented normally, and CR0 is not modified. In the currently preferred embodiment, the flag specifier q is in the set [0 ... 26] and the register specifier n is in the set [0 ... 15]. In the currently preferred embodiment, an unconditional branch to CR0 is equivalent to a return, and can be used at the end of a sub-routine.

Call (if Flag not q) (CRn)

If Flag q is reset to 0, the program counter PC is loaded with the content of control register CRn, and the address to return to after completion of the sub-routine is stored in CR0. If Flag q is 1, the program counter is incremented normally, and CR0 is not modified. In the currently preferred embodiment, flag specifier q is in the set [0 ... 26] and the register specifier n is in the set [0 ... 15]. Note that the address to return to after completion of a sub-routine is the address of the third instruction after the call. The two instructions following the call are executed in delay mode before the call completes.

b Halt

The halt instruction stops execution of the program running in the execution unit of the present invention. In the currently preferred embodiment, the halt instruction is issued only when all register scoreboards are cleared, i.e. when all pending data loads from external memory have returned. In the currently preferred embodiment, the halt instruction cannot be grouped with any other instruction and must be by itself in a long instruction.

I claim:

1. A method for executing a case instruction in a computer system that executes a plurality of instructions, wherein said case instruction includes a plurality of branching options, each of which is conditioned and has a respective branch address associated therewith, and further wherein said computer system generates at least one condition indicator in response to the execution of said plurality of instructions, said method comprising the steps of:

storing each of the respective branch addresses associated with each of said plurality of branching options in storage register means prior to execution of said case instruction;

selecting one of said plurality of branching options according to said at least one condition indicator, wherein said at least one condition indicator is indicative of said one of said plurality of branching options;

obtaining the respective branch address associated with said one of said plurality of branching options from said storage register means, the branch address not being included in the case instruction; and implementing said one of the plurality of branching options, such that the computer system branches to the respective branch address associated with said one of the plurality of branching options, such that the case instruction is performed within one cycle.

2. The method as defined in claim 1 wherein said step of implementing comprises the step of sending the respective branch address associated with said one of the plurality of branching options to a program counter of the computer system.

3. A method for performing an instruction with multiple branching options in a computer system that executes a plurality of instructions, wherein said instruction includes a plurality of branching options, each of which is conditioned and has a respective branch address associated therewith, and further wherein said computer system generates at least one condition indicator in response to the execution of said plurality of instructions, said method comprising the steps of:

storing each of the respective branch addresses associated with each of said plurality of branching options in a set of registers prior to execution of said instruction, wherein each register in said set stores one of said branch addresses;

executing said instruction, wherein the step of executing said instruction comprises:

selecting one of the plurality of branching options by examining said at least one condition indicator generated during execution of said plurality of instructions, including obtaining the respective branch address, not included in said instruction, from one of said registers in said set based on said at least one condition indicator, such that one of said plurality of branching options is selected according to said at least one condition indicator upon execution of said instruction; and implementing said one of said plurality of branching options, such that the computer system branches to the respective branch address associated with said one of said plurality of branching options, such that the instruction is performed within one cycle.

4. The method as defined in claim 6 wherein said step of implementing comprises the step of sending the respective branch address associated with said one branching option to a program counter of the computer system.

5. The method as defined in claim 3 wherein said at least one condition indicator comprises at least one condition bit, such that said one of said plurality of branching options is selected according to a state of said at least one condition bit.

6. The method as defined in claim 5 wherein said step of executing includes the step of selecting said one of said plurality of branching options using said at least one condition bit to address said one of said set of registers.

7. An apparatus for executing an instruction with multiple branch options in a computer system that executes a plurality of instructions, wherein said instruction includes a plurality of branching options, each of which is conditioned and has a respective branch address associated therewith, and further wherein said computer system generates at least one condition indicator in response to the execution of said plurality of instructions, said apparatus comprising:

a set of registers for storing data;

means coupled to said set of registers for initializing said set of registers by storing each of the respective branch addresses associated with each of said plurality of branching options in said set of registers, wherein each register in said set is associated with and stores one of said branch addresses;

means for executing said plurality of instructions including said instruction, wherein the execution of at least one of said plurality of instructions generates the condition indicator, such that one of said plurality of branching options is selected according to said at least one condition indicator upon execution of said instruction; and means for implementing said one of said plurality of branching options, such that the computer system branches to the respective branch address associated with said one of said plurality of branching options, such that the instruction is performed within one cycle.

8. The apparatus as defined in claim 7 wherein said means for initializing includes:

means for defining a plurality of states of said at least one condition indicator, each of said plurality of states corresponding respectively to one of said plurality of branching options;

means for assigning each register in said set of registers as corresponding to one of said plurality of states; and means for storing a target address for each of said states in one of said set of registers, such that the register corresponding to said one of said plurality of states is read to obtain the target address during the execution of said multi-alternative instruction.

9. An apparatus for executing an instruction with a plurality of branch options in a computer system, wherein each of plurality of branch options is conditioned, said apparatus comprising:

a control register set, comprising a plurality of registers, to store a plurality of branch addresses, each of which corresponds to a respective one of the plurality of branch options, wherein each of the plurality of registers is associated with a label and is initialized by having stored therein one of the plurality of branch addresses prior to selection of one of the plurality of branch options of the instruction;

a condition bit register to store a plurality of condition bits indicative of one of the plurality of branch options; and a logic circuit coupled to the condition bit register and the control register set, wherein the logic circuit, during execution of the instruction, decodes the plurality of condition bits to generate an address to one of the plurality of registers containing a selected branch address corresponding to the one of the plurality of the branch options indicated by the plurality of condition bits, wherein the selected branch address is sent to a program counter.

* * * * *